US 6,633,994 B1

(12) United States Patent
Hofmann et al.

(10) Patent No.: US 6,633,994 B1
(45) Date of Patent: Oct. 14, 2003

(54) METHOD AND SYSTEM FOR OPTIMIZING DATA TRANSFERS BETWEEN DEVICES INTERCONNECTED BY BUSES OPERATING AT DIFFERENT CLOCKING SPEEDS

(75) Inventors: Richard Gerard Hofmann, Apex, NC (US); Jason Michael Hopp, Apex, NC (US); Rhonda Gurganious Mitchell, Apex, NC (US); Dennis Charles Wilkerson, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/510,178

(22) Filed: Feb. 22, 2000

(51) Int. Cl.[7] .............................. G06F 5/06; G06F 1/04; G06F 13/36
(52) U.S. Cl. .................... 713/600; 713/501; 710/306
(58) Field of Search ................... 713/600, 501; 710/306, 305

(56) References Cited

U.S. PATENT DOCUMENTS

| | | | |
|---|---|---|---|
| 5,434,996 A | 7/1995 | Bell | 395/550 |
| 5,448,715 A | 9/1995 | Lelm et al. | 395/550 |
| 5,459,855 A | 10/1995 | Lelm | 395/550 |
| 5,487,092 A | 1/1996 | Finney et al. | 375/354 |
| 5,557,224 A | 9/1996 | Wright et al. | 327/115 |
| 5,588,004 A * | 12/1996 | Suzuki et al. | 370/516 |
| 5,664,165 A * | 9/1997 | Curry et al. | 713/501 |
| 5,758,131 A | 5/1998 | Taylor | 395/552 |
| 5,768,602 A | 6/1998 | Dhuey | 395/750.04 |
| 5,784,599 A | 7/1998 | Elkhoury | 395/556 |
| 5,796,995 A | 8/1998 | Nasserbakht et al. | 395/558 |
| 5,898,640 A | 4/1999 | Ben-Meir et al. | 365/233 |
| 5,935,255 A | 8/1999 | So et al. | 713/400 |
| 6,301,629 B1 * | 10/2001 | Sastri et al. | 710/305 |
| 6,311,245 B1 * | 10/2001 | Klein | 710/306 |

FOREIGN PATENT DOCUMENTS

JP       57-118426        7/1982

OTHER PUBLICATIONS

The CoreConnect Bus Architecture, 1999, IBM, pp. 8.*
IBM announces open on–chip bus architecture, Jun. 21, 1999, IBM, http://www–3.ibm.com/chips/news/1999/core-connect, pp. 2.*
"Core Connect Bus Architecture," available via the Internet at http://www.chips.ibm.com/products/coreconnect, copy printed Jan. 05, 2000, 3 pp.
"Method and Apparatus for Handling Multiple Clock Domain at Speed Logic Built–in Self–Test within a Single Logic Built–in Self–Test Structure, "*IBM Technical Disclosure Bulletin*, vol. 38 No. 11, Nov. 1995, p. 499.
"Passing Data Stream Across Asynchronous Clock Domains in Scalable Coherent Interface Bus," *IBM Technical Disclosure Bulletin*, vol. 36 No. 11, Nov. 1993, pp. 373–375.
"Method for Synchronizing Domain Controller with Other Network Servers," *IBM Technical Disclosure Bulletin*, vol. 37 No. 12, Dec. 1994, p. 539.

* cited by examiner

*Primary Examiner*—Thomas Lee
*Assistant Examiner*—Suresh K Suryawanshi
(74) *Attorney, Agent, or Firm*—Scott W. Reid; Winstead, Sechrest & Minick, LLP

(57) ABSTRACT

Disclosed is a method and apparatus for optimizing communication between buses operating at different frequencies. A high speed bus provides communication between high speed devices as well as provides communication to a lower speed bus which provides communications between low speed devices and between low speed devices and high speed devices. During transaction reset a bridge device that controls communication between the high and low speed buses determines the ratio of the respective bus clocks. The bridge device sets a logic state machine based on this data and selects from the higher frequency clock selected cycles on which transfers to the lower speed bus take place. The unused cycles of the high speed clock may then be used on the high speed bus for additional transfers. The clock ratios may be determined on each transaction reset and new data on clock ratios stored in the bridge device for subsequent operation.

22 Claims, 5 Drawing Sheets

METHOD AND SYSTEM FOR OPTIMIZING DATA TRANSFERS BETWEEN DEVICES INTERCONNECTED BY BUSES OPERATING AT DIFFERENT CLOCKING SPEEDS

TECHNICAL FIELD

The present invention relates in general to data processing systems, and in particular, to interfacing two buses that may be clocked at different frequencies.

BACKGROUND INFORMATION

Recent advances in silicon densities now allow for the integration of numerous functions onto a single silicon chip. With this increased density, peripherals formally attached to the processor at the card level have drivers that are now integrated onto the same die as the processor. As a result, chip designers must now address issues traditionally handled by the system designer. In particular, the on chip buses used in such system-on-a-chip (SOC) designs must be sufficiently flexible and robust in order to support a wide variety of embedded system needs.

The IBM Blue logic core program, for example, provides the framework to efficiently realize complex system-on-a-chip designs. Typically, a SOC contains numerous functional blocks representing a very large number of logic gates. Designs such as these are best realized through a macro-based approach. Macro-based designs provide numerous benefits during logic entry and verification, but the ability to reuse intellectual property is often the most significant benefit. From generic serial ports to complex memory controllers and processor cores, each SOC generally requires the use of common macros.

Many single chip solutions used in applications today are designed as custom chips, each with its own internal architecture. Logical units within such a chip are often difficult to extract and reuse in different applications. As a result, many times the same function is redesigned from one application to another. Promoting reuse by ensuring macro interconnectivity is accomplished by using common buses for inter-macro communications. To that end, the IBM CoreConnect architecture, for example, provides three buses for interconnecting cores, library macros, and custom logic. These buses are the Processor Local Bus (PLB), On Chip Peripheral Bus (OPB) and Device Control Register (DCR) Bus. Other chip vendors may have similar SOC core architectures, for example Advanced Microcontroller Bus Architecture (AMBA) from ARM Ltd.

FIG. 1 illustrates how the prior art CoreConnect architecture is used to interconnect macros and the PowerPC 405, GP embedded controller. High-performance, high bandwidth blocks such as the Power PC 405 CPU core, PCI bridge and SDRAM controller reside on the PLB 103, while the OPB 102 hosts lower data rate peripherals. The daisy chain DCR bus 104 provides a relatively low-speed data path for passing configuration and status information between the PowerPC 405 CPU core and other on chip macros. A PLB Arbiter 105 would handle contention between devices on PLB 103.

The CoreConnect architecture shares many similarities with other advanced bus architecture in that they support data widths of 32 bits and higher, utilize separate read and write data paths and allow multiple masters. For example, the CoreConnect architecture and AMBA 2.0 now both provide high-performance features including pipelining, split transactions and burst transfers. Many custom designs utilizing the high-performance features of the CoreConnect architecture are available in the marketplace today.

The PLB and OPB buses provide the primary means of data flow among macro elements. Because these two buses have different structures and controls, individual macros are designed to interface to either the PLB or the OPB. Usually the PLB interconnects high bandwidth devices such as processor cores, external memory interfaces and DMA controllers. The PLB addresses the high-performance, low latency and design flexibility issues needed in the highly integrated SOC.

The PLB specification describes a system architecture along with a detailed description of the signals and transactions. PLB based custom logic systems require the use of PLB macro to interconnect their various master and slave macros.

FIG. 1 also illustrates a connection of multiple masters and slaves through the PLB macro. Each PLB master is attached to the PLB macro by separate address, read data and write data buses and a plurality of transfer qualifier signals. PLB slaves are attached to the PLB macro via shared, but decoupled, address, read data and write data buses along with transfer control and status signals for each data bus.

The OPB 102 is a secondary bus architected to alleviate system performance bottlenecks by reducing capacitive loading on the PLB 103. Peripherals suitable for attachment to the OPB include serial ports, parallel ports, Universal Asynchronous Receiver Transmitters (UARTs), timers and other low-bandwidth devices. As part of the IBM Blue Logic cores program, all OPB core peripherals directly attach to OPB. This common design point accelerates the design cycle time by allowing designers to easily integrate complex peripherals into an application specific integrated circuit (ASIC).

PLB masters gain access to the peripherals on the OPB 102 through the OPB Bridge macro. The OPB Bridge acts as a slave device on the PLB and a master on the OPB 102. The OPB Bridge performs dynamic bus sizing, allowing devices with different data path widths to efficiently communicate. When the OPB Bridge master performs an operation wider than the selected OPB slave, the bridge splits the operation into two or more smaller transfers.

As stated, the PLB 103 and OPB 102 buses may operate at different speeds. The PLB 103 handles primarily high speed communication and the OPB 102 lower speed communication. The PLB and OPB may operate with speed multiples of two to one or higher and Interbus communication is handle via the OPB Bridge macro. If the PLB 103 is operating at a higher clock than the OPB 102, a portion of the OPB Bridge would likewise have to operate at the same clock speed even though the transfer to the OPB 102 could only handle lower speed transactions. If the clock speed ratio between a PLB103 and a OPB102 was known in advance, then on certain transactions, the extra clock cycles of the PLB clock may be "saved" for other purposes while maintaining an optimum communication between buses, set by the speed of the slower OPB. Clearly there is a need for a method to optimize transactions between two buses operating at different clock speed ratios.

SUMMARY OF THE INVENTION

The present invention discloses a method and apparatus for managing data transfers between buses operating at different clock frequencies. A low speed bus communicating with a higher speed bus may cause both buses to operate at a speed determined by the lower speed bus. Embodiments of the present invention disclose a system that allows the higher speed bus to utilize unused clock cycles of its bus clock during data transfers between buses. A ratio circuit determines the ratio of the clock frequencies of communicating buses on a transaction reset. Cycle control data is calculated and used to set a logic state machine coupled to each bus. The logic state machine for the lower speed bus determines selected cycles of the high speed bus clock optimized to the low speed bus clock. These selected cycles are used in data transfers between the high speed bus and the low speed bus. The cycles of the higher speed bus clock not used to transfer data to the lower speed bus may be used in data transfers between devices communicating only on the higher speed bus. In this manner the idle cycles of the higher speed bus may continue to be utilized during inter-bus data transfers. Embodiments of the present invention update the logic state machines on a transaction reset so that communication between buses may be optimized on different bus transactions. The clock ratio detection circuit and the cycle control circuit may be disabled after cycle control data is latched in the logic state machines thus conserving power.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
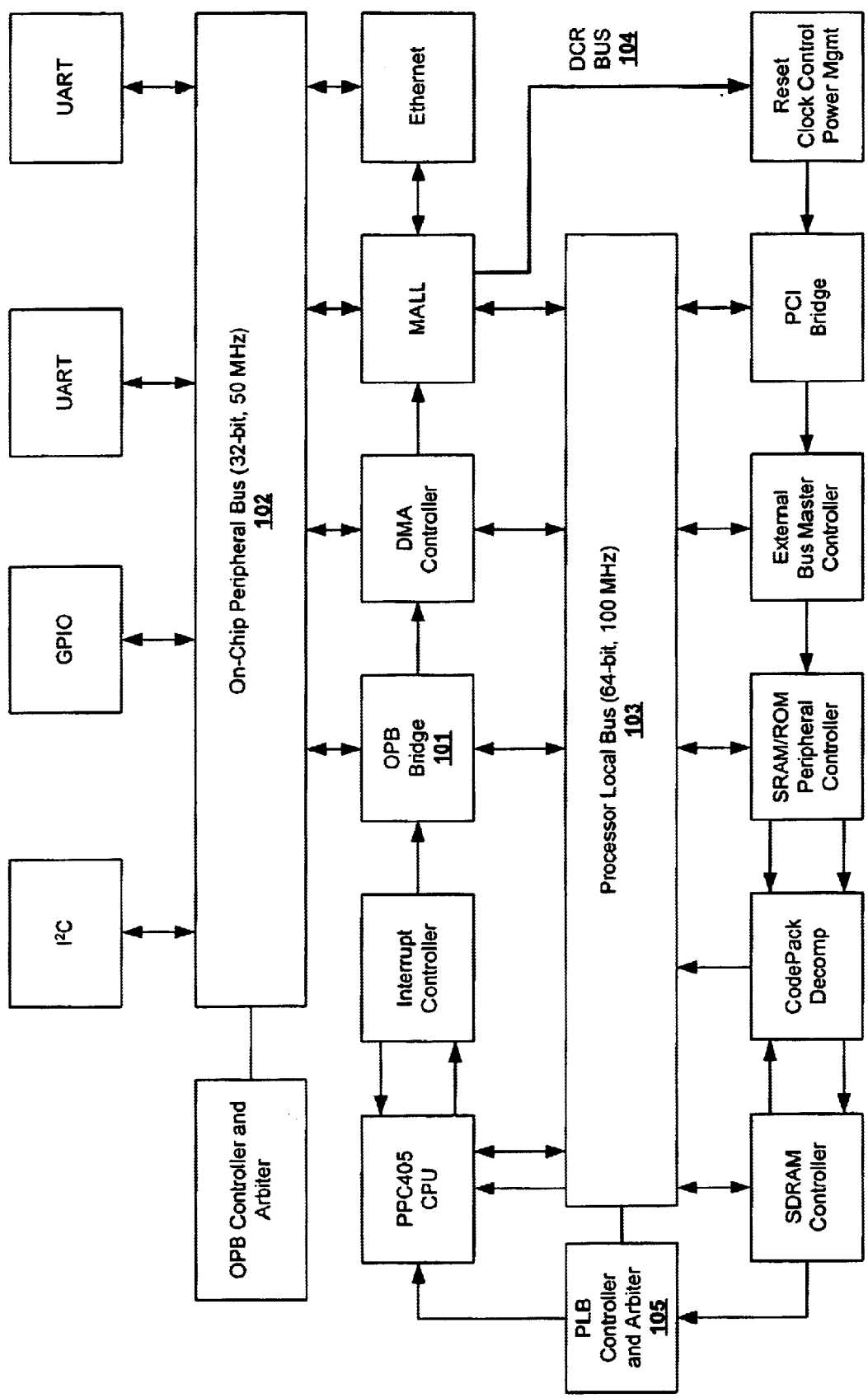
FIG. 1 is a block diagram of the interconnect macros in the PowerPC 405 GP embedded controller.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like may have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a detailed block diagram of the buses internal to the prior art IBM PowerPC 405GP embedded controller. The On-chip Peripheral Bus (OPB) 102, in this illustration, runs at 50 MHz and is 32 bits wide while the Processor Local Bus (PLB) 103 is 64 bits wide and runs at 100 MHz. The effective bandwidth ratio between these two buses is four to one. The PLB 103 is running at twice the clock frequency and is twice as wide as the OPB 102. If the PLB 103 was streaming data to a device on the OPB 102, the data would go through the OPB bridge macro 101.

Figure 2:
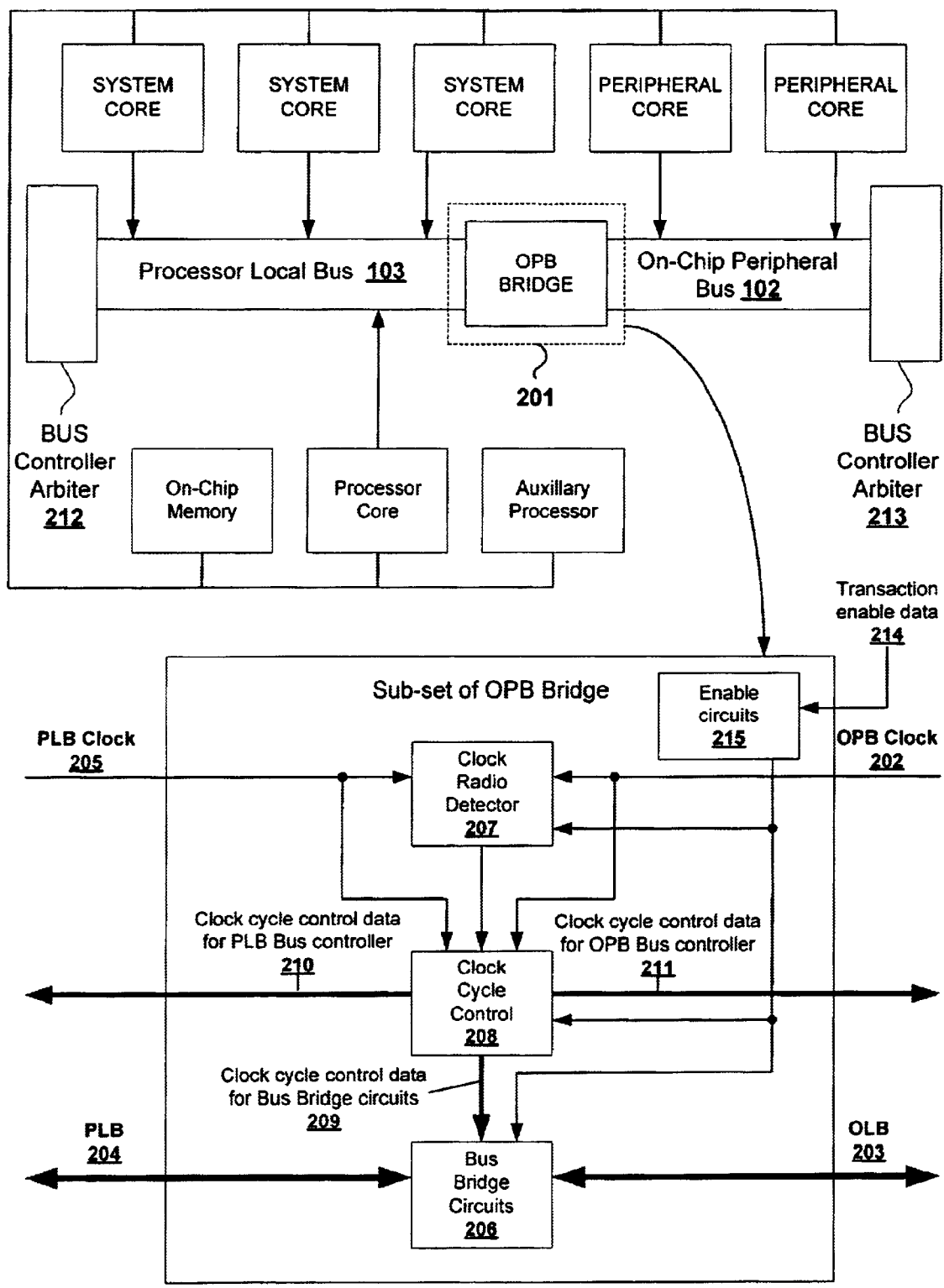
FIG. 2 simplified diagram of the interconnect macros on the Processor Local Bus (PLB) and the On-Chip Peripheral Bus (OPB) with an illustration of circuits in one embodiment of the present invention.

FIG. 2 is a somewhat simplified diagram of the PLB 103 and the OPB 102 highlighting the OPB Bridge 201. FIG. 2 also illustrates circuits in one embodiment of the present invention shown as a subset of the OPB Bridge 201. In the example of FIG. 2, a clock ratio detection circuit 207 is used to determine the ratio between the frequency of the clocks, OPB clock 202 and PLB clock 205. A clock ratio circuit, such as 207, may employ a variety of logic circuit designs to determine a ratio the clocks. For example, transitions of each clock may be counted for some time period P and an logic divider circuit is used to determine a ratio of the clocks with the accuracy determined by the time period P. Alternately an up/down counter may also be employed counting up, for example with PLB clock 205, for a time period (e.g., one microsecond) and then counting the number of microseconds required, counting down for example with OPB clock 202, to reach a zero count. Calculating circuits common in computer processors may also be employed to further process the data to achieve a satisfactory ratio.

Once the ratio has been determined, a clock cycle control circuit 208 is used to generate clock cycle control data that is sent to a PLB bus controller 212 a OLB bus controller 213 and Bus Bridge Circuits 206. The clock cycle control circuit 208 may also receive information defining the bus widths of the communicating buses to use in generating cycle control data. The clock cycle control circuit 208 may be designed variety of logic designs. Combinatorial or sequential circuits as well as programmed processors may be employed to generate the required cycle control data for use by the logic state machines used in the exemplary bus controllers 212 and 213 and bus bridge circuits 206. One skilled in the art of logic design would readily realize that multiple approaches are possible depending on a particular system design.

The clock cycle control data, 209, 210, and 211 are used in logic state machines (not shown) to facilitate selection of cycles, from the high frequency PLB clock 205, necessary for the data transfer operations between the exemplary buses PLB 204 and OPB 203. The clock ratio detect circuit 207 determines the ratio of the clocks, then exemplary registers (not shown) in logic state machines (not shown) may be used to store clock cycle control data. After a transaction reset, a new frequency ratio may exist for clocks involved in communicating buses, if so, new cycle control data would be generated by the clock cycle control 208. The new cycle control data would be stored in registers in corresponding logic state machines that controls which periods of the PLB clock 205 are used in transfers to the OPB 203. The clock ratio detector 207 and the clock control circuit 208 may be disabled after generating and storing cycle control data to conserve power during operation. The clock cycle control data is used in one logic state machine operating in the domain of the higher speed bus and another logic state machine operating in the domain of the lower speed bus. In this manner, embodiments of the present invention can optimize and synchronize the transfer of data from a higher speed bus to a lower speed bus using only selected cycles of the higher speed bus's clock. On periods or cycles of the higher speed bus clock not needed during data transfers to the lower speed bus, the higher speed bus may use those cycles for data transfers between devices communicating on its data bus. In the example illustrated in FIG. 2, the PLB 204 is the higher speed bus and the OLB 203 is the lower speed bus.

An exemplary logic state machine would be synchronized with the beginning of a transaction such that cycles of the high speed clock may selected as described. One skilled in the art of logic design would realize that many different circuit configurations may be employed for the logic state machines described. The particular circuit would depend on the types and quantities of gates available for a particular system design.

Embodiments of the present invention may be employed only on certain data transfer transactions. The bus controllers would receive, in the clock cycle control data, enable signals either allowing normal operation or enabling the circuits that select particular cycles of the high speed bus clock for low speed operation while using the remaining cycles for high speed bus data transfers as explained in embodiments of the present invention. Which transactions that are enabled may be determined beforehand and such data would either reside in system microcode or be loaded and stored on system power up. Transaction enable data 214 is used by enable circuit 215, shown in FIG. 2. Enable signals are coupled to the Bus Bridge Circuits 206, clock ratio circuit 208, and clock cycle control circuit 207 and used to enable these circuits for desired data transfer transactions.

In FIG. 2, bus controllers 212 and 213 for the PLB 204 and the OLB 203 respectively, control which devices communicating on those buses have access to the bus at any one time. Bus Bridge Circuits 206 are used to transfer data between exemplary buses PLB 204 and OLB 203. The Bus Bridge Circuits 206 may also employ a logic state machine accepting exemplary cycle control data 209 to enable overall synchronization and optimization of data transfers employing embodiments of the present invention. Optimization in this sense may determine, for example, whether to fully utilize the low speed bus or favor high speed bus transactions. Even though a low speed bus may be utilized using a particular number of high speed clock cycles on particular transactions, a determination may be made to use a fewer number than possible given a certain high speed to low speed clock ratio.

Figure 4:
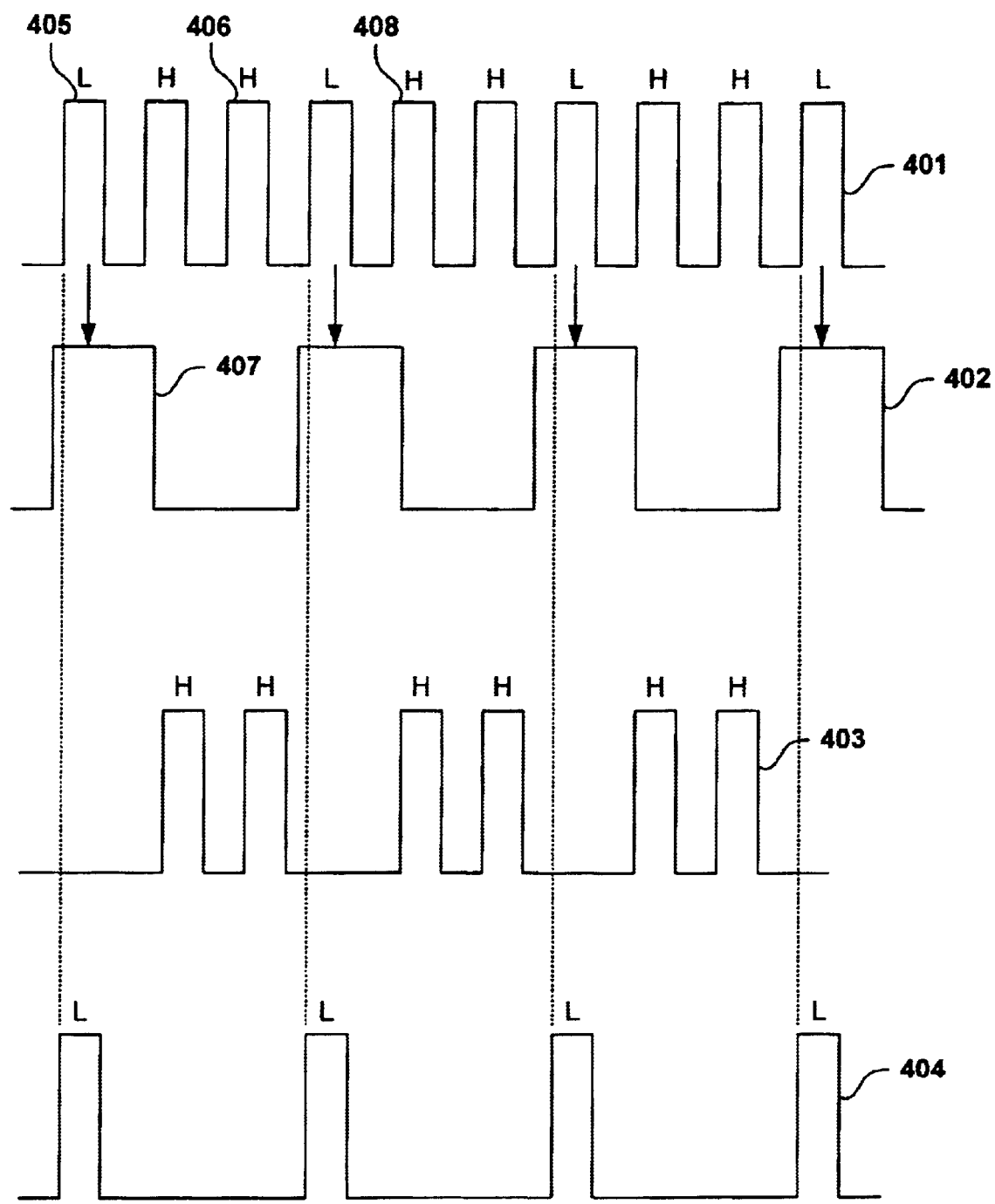
FIG. 4 show waveforms illustrating bus clocks and selected clock cycles used in embodiments of the present invention.

FIG. 4 is a illustrative timing diagram showing selected cycles of a higher speed clock. High speed clock 401 has exemplary cycle marked as L 405 and as H 406. L 405 illustrates a high speed cycle that is coincident with a low speed cycle (e.g., 407) of low speed clock 402. Since the low speed bus that is using clock 402 can only transfer data at its clock rate, then only one data transfer cycle from the high speed clock 401 is necessary during exemplary clock cycle 407. The other cycles of the high speed clock, for example, cycle 406 and cycle 408 are free and may be used by the high speed bus controller (not shown) to transfer data between devices communicating on its bus lines. Waveform 403 is an illustration of the effective high speed clock available for high speed bus device data transfers while the high speed bus is communicating with the low speed bus. In the example in FIG. 4, the effective low speed clock, illustrated by waveform 404, remains the same as clock 402. Other bus clock ratios may result in non-regular patterns of data transfers when a high and low speed bus are communicating using embodiments of the present invention where cycles of a high speed clock are selected and optimized to a lower speed bus clock.

Embodiments of the present invention enable the clock ratio detector and the cycle control circuit during a transaction reset so the logic state machines can be set up to facilitate communication between buses that may be operating at different frequencies. The clock ratio detect and the cycle control circuits may be disabled and thus would consume no power during bus data transfer operations.

Figure 5:
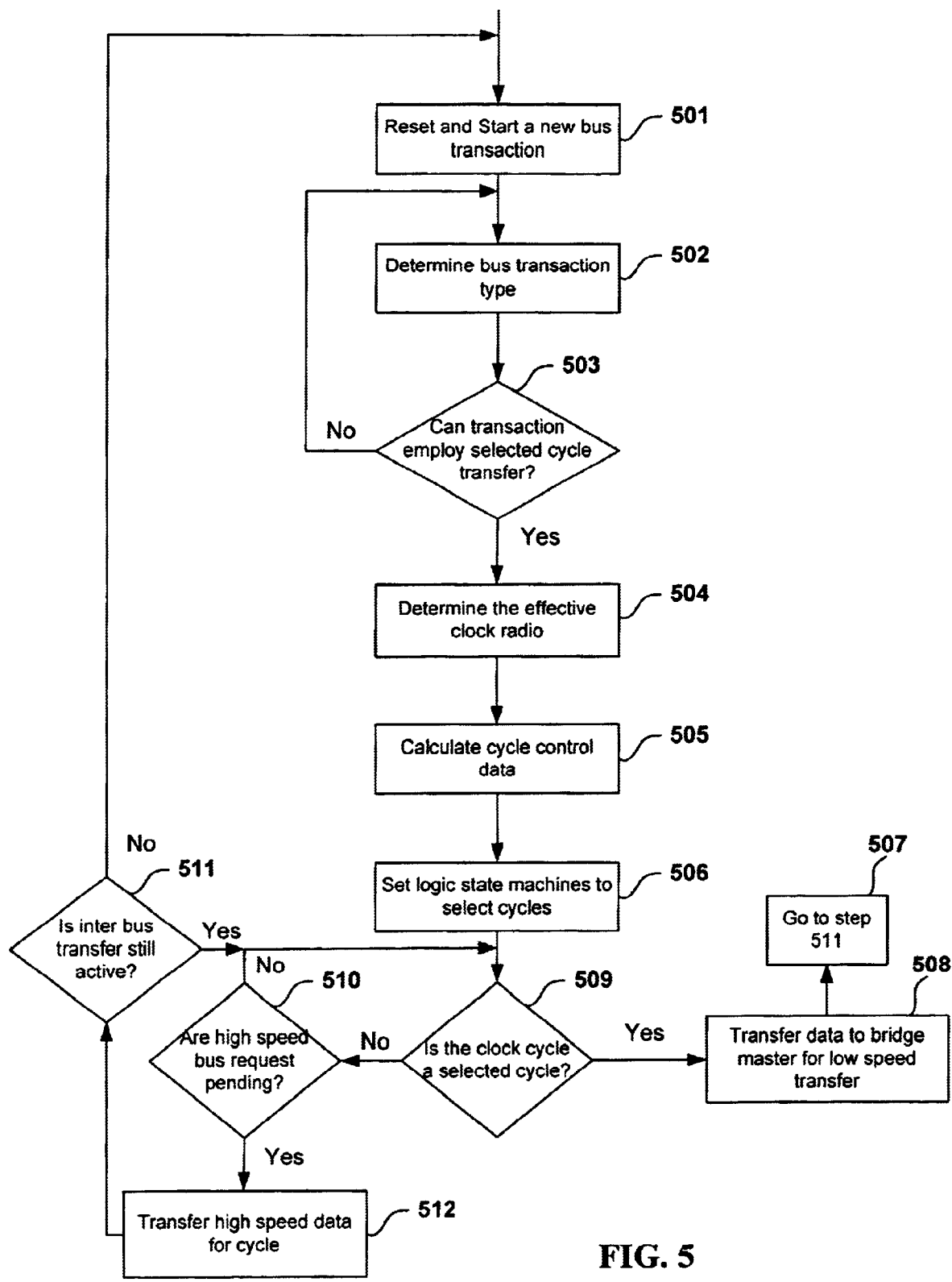
FIG. 5 is a flow diagram of the steps in the method employed in embodiments of the present invention.

FIG. 5 is a flow diagram of method steps employed in embodiments of the present invention. These method steps take place primarily in a modified OPB Bridge device. A transaction reset, starting a new bus transaction, starts in step 501. In step 502, a determination is made as to the pending transaction type. In step 503, a determination is made whether the transaction may employ selected cycle transfer disclosed in embodiments of the present invention. If selected cycle transfers cannot be employed, a return is issued to step 502 to await a new transaction request. If selected cycle transfers can occur, then the effective clock ratio is determined in step 504 and cycle control data is calculated in step 505, and the logic state machines are set to select cycles in step 506. If a selected cycle is one on which a low speed transfer may occur, data is transferred to a bridge master in step 508. In step 507, a branch is issued to the test in step 511. Whether the inter-bus transfer is still active is tested in step 511; if "yes", a branch back to step 509 is executed to test the next cycle. If the result of step 511 step is "no", then a return is issued to step 501 to await a new bus transaction. In step 509, if the clock cycle is not one for a low speed transfer, then in step 510 a test is performed to determine whether a high speed bus request is executed. If no high speed bus request is active, then a branch to step 509 is executed to test the next clock cycle. If a high speed bus request is active in step 510, then the pending data is transferred for the cycle in step 512 and the state of the inter bus transfer is tested in step 511. If the inter bus transfer is still active in step 511, then a branch is executed back to step 509 to test the next clock cycle. If the inter-bus transfer is not active in step 511, then a branch is executed back to step 501 awaiting a new bus transaction.

Figure 3:
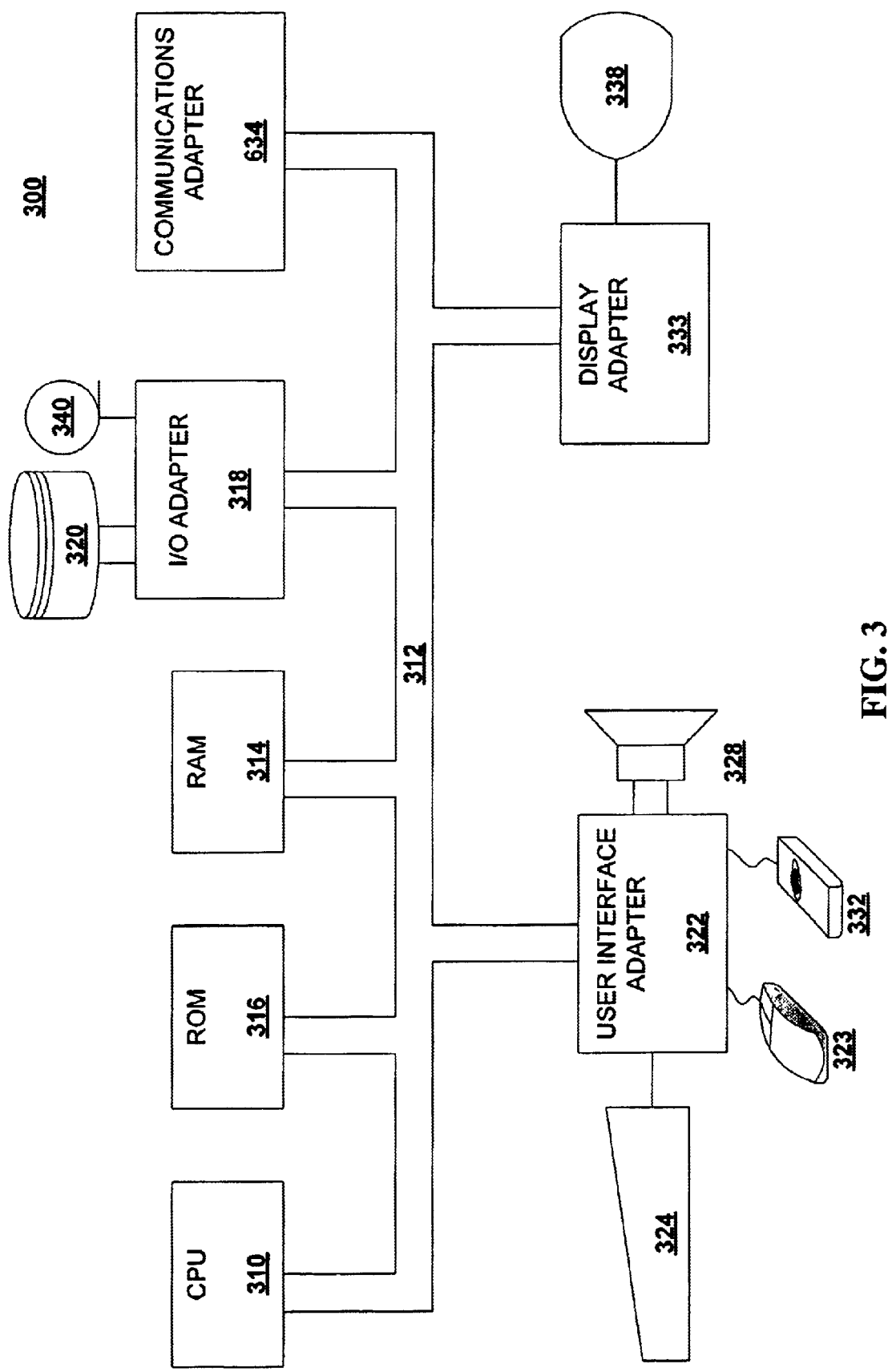
FIG. 3 is a data processing system configured to use the present invention.

Referring to FIG. 3, an example is shown of a data processing system 300 which may be used for the invention. The system has a central processing unit (CPU) 310, which is coupled to various other components by system bus 312. Read-only memory ("ROM") 316 is coupled to the system bus 312 and includes a basic input/output system ("BIOS") that controls certain basic functions of the data processing system 300. Random access memory ("RAM") 314, I/O adapter 318, and communications adapter 634 are also coupled to the system bus 312. I/O adapter 318 may be a small computer system interface ("SCSI") adapter that communicates with a disk storage device 320. Communications adapter 634 interconnects: bus 312 with an outside network enabling the data processing system to communicate with other such systems. Input/Output devices are also connected to system bus 312 via user interface adapter 322 and display adapter 333. Keyboard 324, track ball 332, mouse 323, speaker 328 and a fiscal printer (not shown) are all interconnected to bus 312 via user interface adapter 322. Display monitor 338 is connected to system bus 312 by display adapter 333. In this manner, a user is capable of inputting to the system throughout the keyboard 324, trackball 332 or mouse 323 and receiving output from the system via speaker 328 and display 338. The CPU 310 may comprise integrated circuit chips (not shown) configured such that circuit elements (not shown) in the integrated circuits communicate on a high speed bus. The circuit elements may also communicate to external devices, for example ROM 316, RAM314, etc. that operate on a lower speed bus 312. The data processing system illustrated in FIG. 3 may use embodiments of the present invention to improve performance by only using selected cycles of the high speed bus in data transfers to the lower speed bus.

Although the present invention and its advantages have been described in detail, it should be understood that various changes, substitutions and alterations can be made herein without departing from the spirit and scope of the invention as defined by the appended claims.

What is claimed is:

1. A method for managing data transfers between a first and a second bus with first and second bus clock frequencies, comprising the steps of:

determining a ratio between said first and second bus clock frequencies;

generating clock cycle control data from said determined ratio;

using said clock cycle control data and determining from said first bus clock a selected first number of clock periods, said selected first number of clock periods of said first bus clock frequency used for data transfers between said first and second buses; and using said clock cycle control data and determining remaining second number of clock periods of said first clock, said remaining second number of clock periods used for data transfers between devices communicating on said first bus.

2. The method of claim 1, wherein said first bus clock frequency is higher than said second bus clock frequency.

3. The method of claim 1, wherein said cycle control data is received in a first logic state machine operating in a domain of said first bus and a second logic state machine operating in a domain of said second bus.

4. The method of claim 1, wherein said ratio of clock frequencies is determined at a transaction reset.

5. The method of claim 1, wherein said clock cycle control data is received on said transaction reset.

6. The method of claim 3, wherein said first logic state machine controls transfers from said second bus to a first bus controller and said second logic state machine controls transfers from said first bus to said second bus controller, said first bus controller controlling communication on said first bus and said second bus controller controlling communication on said second bus.

7. The method of claim 3, wherein said first and second logic state machine reside in a bridge device, said bridge device controlling communication between said first and second buses.

8. The method of claim 1, wherein said first selected number of clock periods of said first bus clock are synchronized with cycles of said second bus clock.

9. A system for managing data transfers between a first bus and a second bus with first and second bus clock frequencies respectively, comprising:

a clock ratio circuit operable to determine a ratio between said first and second bus clock frequency, said first bus clock frequency clocking said first bus and said second bus clock frequency clocking said second bus;

a clock cycle control circuit operable for receiving said first and second bus clock, said ratio between said first and second bus clock frequency and generating clock cycle control data;

a first select circuit receiving said cycle control data, said first select circuit operable for selecting in response to said cycle control data and said first bus clock, first selected clock periods from said first bus clock, said first selected number of clock periods used with said first bus clock for data transfers between devices on said first buses;

a second select circuit receiving said cycle control data, said second select circuit operable for selecting in response to said cycle control data and said first bus clock, second selected clock periods from said first bus clock, said second selected clock periods used with said first bus clock for data transfers between said first bus and said second bus; and an enable circuit coupled to said clock ratio circuit and operable for receiving transaction reset signals and enabling said clock ratio circuit, said clock cycle control circuit, and said first and second logic state machines.

10. The system of claim 9, wherein said first select circuit is a first logic state machine operating in the domain of said first bus and said second select circuit is a second logic state machine operating in the domain of said second bus.

11. The system of claim 9, wherein said enable circuit enables said clock ratio circuit and said clock cycle control circuit during a reset and disables said clock ratio circuit and said clock cycle control circuit after a reset to conserve power.

12. The system of claim 9, wherein said ratio of clock cycle data is received during said transaction reset.

13. The system of claim 10, wherein said first logic state machine controls transfers from said second bus to a first bus controller and said second logic state machine controls transfers from said first bus to said second bus controller, said first bus controller controlling communication on said first bus and said second bus controller controlling communication on said second bus.

14. The system of claim 10, wherein said first and second logic state machine reside in a bridge device, said bridge device controlling communication between said first and second buses.

15. The system of claim 9, wherein said second selected number of clock periods of said first bus clock are synchronized with cycles of said second bus clock.

16. A data processing system, comprising:

a central processing unit (CPU);

shared random access memory (RAM);

read only memory (ROM);

an I/O adapter;

a display adapter;

a display; and a bus system coupling devices internal to said CPU and devices external to said CPU, said bus system comprising bridging devices between buses operating at different frequencies, said bridging devices used to manage data transfers between said buses operating at different frequencies, said bridging device comprising:

a clock ratio circuit operable to determine a ratio between said first and second bus clock frequency, said first bus clock frequency clocking said first bus and said second bus clock frequency clocking said second bus;

a clock cycle control circuit operable for receiving said first and second bus clock, said ratio between said first and second bus clock frequency and generating clock cycle control data;

a first select circuit receiving said cycle control data, said first select circuit operable for selecting in response to said cycle control data and said first bus clock, first selected clock periods from said first bus clock, said first selected number of clock periods used with said first bus clock for data transfers between devices on said first buses;

a second select circuit receiving said cycle control data, said second select circuit operable for selecting in response to said cycle control data and said first bus clock, second selected clock periods from said first bus clock, said second selected clock periods used with said first bus clock for data transfers between said first bus and said second bus; and an enable circuit coupled to said clock ratio circuit and operable for receiving transaction reset signals and enabling said clock ratio circuit, said clock cycle control circuit, and said first and second logic state machines.

17. The data processing of claim 16, wherein said first select circuit is a first logic state machine operating in the domain of said first bus and said second select circuit is a second logic state machine operating in the domain of said second bus.

18. The data processing system of claim 16, wherein said enable circuit enables said clock ratio circuit and said clock cycle control circuit during a reset and disables said clock ratio circuit and said clock cycle control circuit after a reset to conserve power.

19. The data processing system of claim 16, wherein said ratio of clock cycle data is received during said transaction reset.

20. The data processing system of claim 17, wherein said first logic state machine controls transfers from said second bus to a first bus controller and said second logic state machine controls transfers from said first bus to said second bus controller, said first bus controller controlling communication on said first bus and said second bus controller controlling communication on said second bus.

21. The data processing system of claim 17, wherein said first and second logic state machine reside in a bridge device, said bridge device controlling communication between said first and second buses.

22. The data processing system of claim 16, wherein said second selected number of clock periods of said first bus clock are synchronized with cycles of said second bus clock.

* * * * *